United States Patent
Lunel et al.

(10) Patent No.: US 11,725,822 B2
(45) Date of Patent: Aug. 15, 2023

(54) COMBUSTION MODULE FOR A GAS TURBO ENGINE WITH CHAMBER BOTTOM STOP

(71) Applicant: SAFRAN AIRCRAFT ENGINES, Paris (FR)

(72) Inventors: Romain Nicolas Lunel, Moissy-Cramayel (FR); Damien Bonnefoi, Moissy-Cramayel (FR); Christophe Pieussergues, Moissy-Cramayel (FR); Luc Namer, Moissy-Cramayel (FR); Dominique Raulin, Moissy-Cramayel (FR); Dan Ranjiv Joory, Moissy-Cramayel (FR); Benjamin Frantz Karl Villenave, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 971 days.

(21) Appl. No.: 16/423,953

(22) Filed: May 28, 2019

(65) Prior Publication Data
US 2019/0383489 A1    Dec. 19, 2019

(30) Foreign Application Priority Data

May 28, 2018    (FR) ...................................... 1854505

(51) Int. Cl.
*F23R 3/60*    (2006.01)
*F02C 3/06*    (2006.01)
(Continued)

(52) U.S. Cl.
CPC .................. *F23R 3/60* (2013.01); *F02C 3/06* (2013.01); *F02C 7/20* (2013.01); *F02C 7/22* (2013.01);
(Continued)

(58) Field of Classification Search
CPC ..................................... F02C 7/20; F23R 3/60
See application file for complete search history.

(56) References Cited

U.S. PATENT DOCUMENTS 5,323,600 A * 6/1994 Munshi ..................... F23R 3/60
  60/772
6,216,442 B1    4/2001 Belsom et al.
(Continued)

FOREIGN PATENT DOCUMENTS

EP    2 003 399 A2    12/2008
EP    2 031 303 A1    3/2009
(Continued)

OTHER PUBLICATIONS

French Application No. 1854505; Search Report dated Nov. 6, 2018—9 pgs. (In French; relevance found in the citations therein).

*Primary Examiner* — Arun Goyal
(74) *Attorney, Agent, or Firm* — Cozen O'Connor (57) ABSTRACT

The invention concerns a turbo engine comprising a combustion chamber (110) arranged inside the outer housing (112) and comprising an internal revolution wall (118) and an external revolution wall (116). First stop parts (54) and second stop parts (56) fixed respectively to the outer housing and to the combustion chamber are provided, the first and second stop parts being adapted to come to a substantially axial stop two by two by forming stop pairs (58).

17 Claims, 5 Drawing Sheets

(51) Int. Cl.
  *F02C 7/20* (2006.01)
  *F02C 7/22* (2006.01)
  *F02C 9/16* (2006.01)
  *F23R 3/26* (2006.01)
  *F23R 3/28* (2006.01)

(52) U.S. Cl.
  CPC .................. *F02C 9/16* (2013.01); *F23R 3/26* (2013.01); *F23R 3/28* (2013.01); *F05D 2220/323* (2013.01); *F05D 2260/30* (2013.01)

(56) References Cited

U.S. PATENT DOCUMENTS

| | | |
|---|---|---|
| 2011/0000216 A1 | 1/2011 | Imamura et al. |
| 2012/0036857 A1 | 2/2012 | Bassani |
| 2018/0017260 A1* | 1/2018 | Clark .................... F01D 25/243 |
| 2018/0080650 A1* | 3/2018 | Pucci ...................... F23R 3/002 |
| 2019/0293294 A1* | 9/2019 | Hucker .................... F23R 3/60 |

FOREIGN PATENT DOCUMENTS

| | | |
|---|---|---|
| EP | 2 402 566 A2 | 1/2012 |
| EP | 2 527 744 A2 | 11/2012 |
| FR | 2989426 A1 | 10/2013 |
| JP | S56 40027 A | 4/1981 |
| JP | S59 9431 A | 1/1984 |
| JP | S59 113663 U | 8/1984 |
| WO | WO2013153322 | 10/2013 |

\* cited by examiner

COMBUSTION MODULE FOR A GAS TURBO ENGINE WITH CHAMBER BOTTOM STOP

CROSS-REFERENCE TO RELATED APPLICATION

This application claims priority to French Patent Application No. 1854505, filed May 28, 2018, which is incorporated herein by reference.

SUMMARY OF THE INVENTION

This invention concerns an aeronautical gas turbine engine combustion module, precisely the one located in the environment of the turbomachine combustion chamber, which is typically an aeronautical turbomachine, such as a dual-flow turbojet engine.

In such a turbo engine, from upstream to downstream, part of the total air absorbed at the inlet passes through at least one compressor and is diffused into a combustion chamber, where the air is mixed with injected fuel. When ignited, the mixture burns in the combustion chamber, then circulates in at least one turbine, before being ejected downstream.

In fact, a combustion module of a gas turbine engine (also called turbo engine) combustion module having a longitudinal axis is known, comprising:
  an inner housing,
  an outer housing arranged radially outside the inner housing,
  a combustion chamber:
    elongated in an axial direction coinciding with (or coaxial with) said longitudinal axis,
    in which a mixture of air and fuel can flow from upstream to downstream, and
first and second stop parts fixed respectively to the outer housing and to the combustion chamber, said first and second stop parts being adapted to come to a substantially axial stop two by two by forming pairs of stops, and, in at least some stop pairs:
  the first stop part being an internal protrusion present on the external housing, with respectively substantially axial and substantially radial surfaces, and
  the second stop part having a circumferential outer surface with an axial component.
In this document, the expressions:
  "substantially" applied to a direction or axis (such as substantially axial, or substantially radial) has the meaning of "5° more or 5° less",
  the components of a force (which include an "axial component") are the projections of a force into orthogonal vectors according to a given system of axes, and,
  the upstream (side) is the side where, via an injection system, the mixture of air and fuel reaches the annular combustion chamber.

Figure 1:
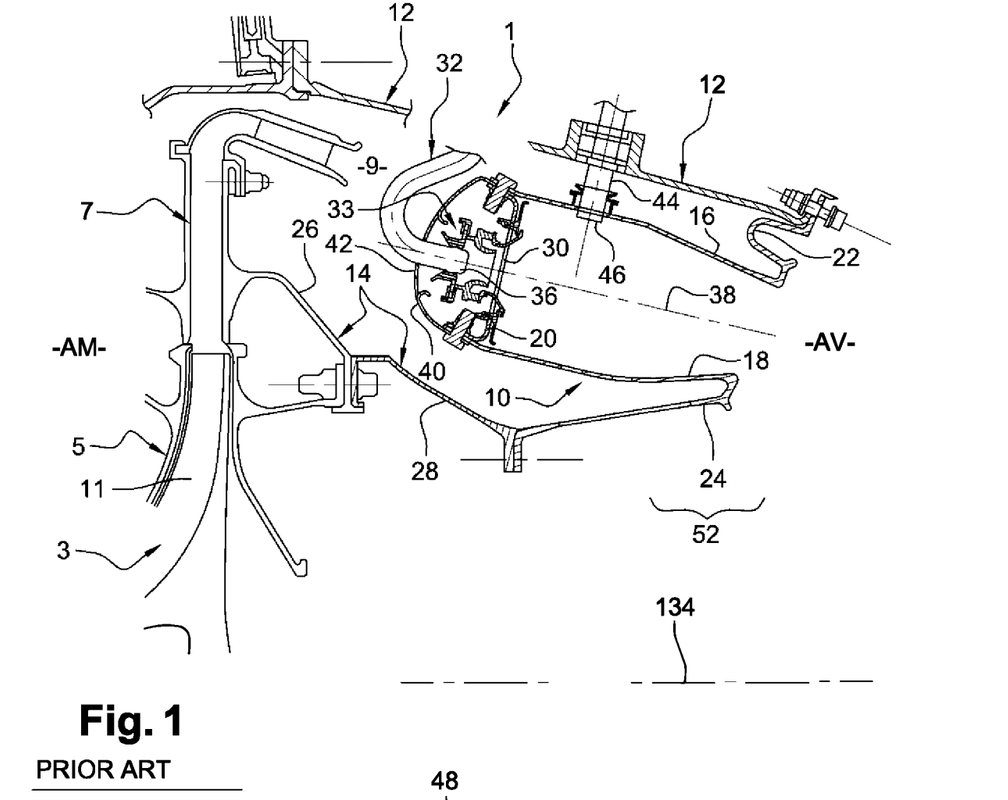
FIG. 1 is a schematic view of an axial section (axis 34/134 below) of a turbo engine part comprising a diffuser and a combustion module according to the prior art.
Figure 2:
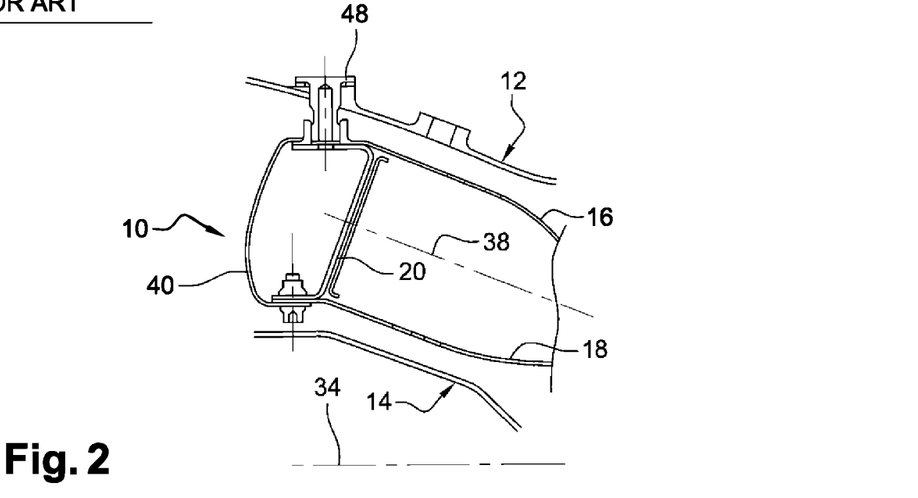
FIG. 2 is the same schematic view, but more localized and angularly shifted about said axis 34/134 below; it can also be considered that it is visually the section II-II of FIG. 5.

FIGS. 1-2 show a current embodiment of such a turbo engine combustion module 1, FIG. 2 showing a schematic view of the assembly of the combustion chamber.

Upstream (US) of combustion module 1, the turbo engine includes a compressor 3—which can be a high-pressure compressor arranged axially, following a low-pressure compressor—whose downstream part (visible in the figure) includes a centrifugal stage 5, and an annular diffuser 7 connected downstream of compressor 3. The diffuser 7 opens into a space 9 surrounding an annular 10 combustion chamber. In addition to combustion chamber 10, combustion module 1 includes, around it, an external housing 12 and an internal housing 14 which delimit the space 9. Combustion chamber 10 is held downstream (DS) by fixing flanges connected to housings 12 and 14. The way the combustion chamber is held could be different; see for example EP2003399 or FR2989426.

Compressor 3 is centrifugal and includes a rotary impeller 11 designed to accelerate the air flowing through it and thereby increase the kinetic energy of the air.

Diffuser 7 annularly surrounds the impeller. Diffuser 7 is used to reduce the speed of the air leaving the impeller and thereby increase its static pressure.

Chamber 10 comprises an outer revolution wall 16 and an inner revolution wall 18 connected upstream to an annular transverse wall 20, or chamber bottom wall, and fixed downstream by radially outer 22 and inner 24 annular flanges respectively on a downstream end of the outer housing 12 of the chamber and on an inner housing 14. It can be considered that the inner housing 14 along chamber 10 is defined by, or includes, a diffuser ferrule 26 and an inner intermediate wall 28 attached upstream to the ferrule 26 and downstream to the inner flange 24.

The chamber bottom wall 20 has openings 30 for the passage of a mixture of air and fuel in chamber 10, with air from diffuser 7 and fuel supplied by injectors 32. The injectors 32 are fixed at their radially outer ends to the outer housing 12 and evenly distributed over a circumference around the axis of rotation 34 of the chamber. Each injector 32 has at its radially inner end a fuel injection head 36 which is aligned with the axis 38 of one of the corresponding holes 30 of the chamber wall 20, this axis 38 being coaxial on the drawing with the longitudinal axis of the illustrated section of the chamber.

The radial aspect will, in this application, be assessed in relation to axes 34 and 38, the axial aspect being therefore assessed in reference to one or other of the said axes 34 and 38, the axis 34 of revolution of combustion chamber 10 being itself parallel to (coaxial with) the longitudinal axis of the turbo engine.

A cover 40, which can be annular and curved upstream, is attached to the upstream ends of chamber walls 16, 18 and 20 and includes air passage ports 42 aligned with ports 30. The mixture of air and fuel injected into chamber 10 is ignited by at least one spark plug 44 that extends radially outside the chamber. Spark plug 44 is guided at its radially inner end into an orifice 46 of the outer chamber wall 16.

In the current technique, and as in the example in FIG. 2, an upstream fixing of combustion chamber 10 can be achieved by at least three fixing pins 48 circumferentially distributed around axis 34.

Preferably, there are four of these pins 48 and they are distributed evenly around axis 34.

However, if temperatures and pressures increase above a certain threshold (500 to 700° C. and 25 to 35×10$^5$ Pa), significant deformations occur. In some places, in particular the bottom chamber wall 20 is excessively deformed axially between the fixing pins 48. These deformations cause:
  movements of the injection system 33 around the injector 32, causing burns to the latter, and degrading operability, particularly in re-ignition,
  ovality of the chamber outlet (zone 52 FIG. 1), which causes burns to the high-pressure distributors (HPD) downstream (DS FIGS. 1,3) of the combustion chamber, and leads to a degradation of performance.

These consequences are unacceptable. In addition, seeking a solution that avoids adding significant additional time to the manufacturing cycle and allows existing parts to be kept (as much as possible) identical is a sought for approach here.

Firstly, it is therefore proposed, as already indicated, that the said combustion module presented above should be such that it also includes first and second stop parts fixed respectively to the outer housing and to the combustion chamber, the first and second stop parts being adapted to come to a substantially axial stop two by two by forming stop pairs.

Thus, relative positions will be made to play in order to adjust, at the expected temperatures and pressures, a possible axial clearance or, on the contrary, apply prestressing, without having to modify the surrounding parts.

In this respect, it is planned a priori that said pairs of stops will complement the upstream chamber fixing means, such as pins 48.

It is also planned a priori that the second stop parts fixed to the combustion chamber come to a stop from upstream to downstream with the first stop parts. This can be planned at room temperature, with the turbo engine idle.

Thus, it is anticipated that at room temperature and with the turbo engine idle, in at least some of the stop pairs, the second stop part will be axially in abutment against the first stop part.

An interest of a solution by abutment stops is that it is possible to act in one direction or in reverse, depending on the relative positions of the first and second stop parts.

It is also possible to provide that at least one substantially radial clearance be established between the first and second stop parts of each pair of stops.

In this way, a radial clearance can be established or authorized to allow, without undue stress, the clearance resulting from the difference in expansion between the outer housing and the combustion chamber, as well as from the tolerance of each part, to be absorbed. This will allow only axial displacements to be taken up.

In order to encourage the relevant consideration of isostatic problems that will arise and to encourage precise, particularly axial, positioning of the combustion chamber, it is also proposed, in at least some of the stop pairs and as already partially mentioned:
  that the first stop part is an internal protrusion of the outer housing (which can be fixed to it), with respectively substantially axial and substantially radial surfaces, and
  that the second stop part has a circumferential outer surface with an axial component from which a substantially radial external protrusion will project locally, next to the first stop part, against which the substantially radial surface of the first stop part can come into contact.

In a conventional way, the expression "component" refers to the fact that the components of an orientation are its projections in orthogonal vectors according to a given system of axes, here respectively along the axis 134 referred to below and radially to it.

At this stage, it is noted that the solution presented here describes an axial stop with radial clearance. It is not used to hold the combustion chamber in place, but to maintain a precise axial positioning of the combustion chamber in relation to the fuel injector(s) (reference 32 below), as well as to take up pressure-related forces when the turbo engine is in operation.

U.S. Pat. No. 6,216,442 discloses, in a different way, a system for holding a tubular combustion chamber in a housing; it therefore provides for a full-fledged system for holding the combustion chamber, unlike the solution presented here. In U.S. Pat. No. 6,216,442, the holding system must therefore be used to block the combustion chamber axially but also radially, resulting in a planned surface area tilted at an angle of 45°.

In this solution, to combine a secure holding of the stop parts and an easy and fast installation/removal (for replacement) in a confined environment, it is also proposed:
  therefore, at least one fuel injector to be provided through at least one opening of the outer housing to bring fuel into the combustion chamber, and
  on at least one said pair of stops:
    that, through a part forming a ring, the first stop part is mounted in said opening of the outer housing, and
    that the second stop part belongs to a locally shouldered plate, fixed on an outer periphery of the combustion chamber.

It is even proposed, for the same reasons:
  that the external revolution wall be connected to the bottom wall of the chamber by screws,
  and that the second stop parts be fixed radially outwardly to the combustion chamber by some of said screws.

Maintaining the first stop part is also an important point, given the forces involved.

Two solutions have been specifically considered:

In the first solution, the inner protrusion has a finger that rests against an inner surface of the outer housing.

While remaining within the dimensions of the outer housing, the force path can thus be directed towards this housing and the finger can be used to manoeuvre this first stop part and orient it at the best angle.

In the second solution, said ring portion has a flange at the location of a radially outer diameter (of this ring), the inner protrusion then being devoid of support against the outer housing.

The first solution allows the first stop part to be positioned from inside of the outer housing, while the second solution facilitates this assembly by allowing the first stop part to be positioned from outside the outer housing. The flange also allows the first stop part to be held in the housing opening, which makes the finger present in the first solution useless.

It should also be noted that placing said pairs of stops at least in azimuth at 12 hours (upper vertical area) and 6 hours (lower vertical area; see zones 50a, 50b, FIG. 5 below) effectively stabilized the combustion chamber in the desired axis, where the stresses were found to be the highest, without bringing any other overload.

In terms of the benefits obtained overall with some or all of the above characteristics, it may be noted:
  the possibility of overcoming the disadvantage of a confined environment,
  the possibility of not having to modify the outer housing or combustion chamber,
  to be able to recover parts already manufactured,
  the use of certifiable technology for a series of several turbojet engines,
  the possibility of taking up strains of several hundreds daN,
  the possibility of avoiding a heavy time constraint (stop for assembly).

In addition to the above, is also concerns a part of a turbo engine including:
  at least one compressor and an air diffuser located at the outlet of said at least one compressor, and
  a combustion module having all or some of the above characteristics, and wherein the inner housing (114 below) comprises an intermediate wall (128 below) fixed with a ferrule (126 below) of the diffuser (107 below).

The invention will be better understood, if need be, and other details, characteristics and advantages of the invention will appear upon reading the following description given by way of a non restrictive example while referring to the appended drawings.

DETAILED DESCRIPTION

Figure 3:
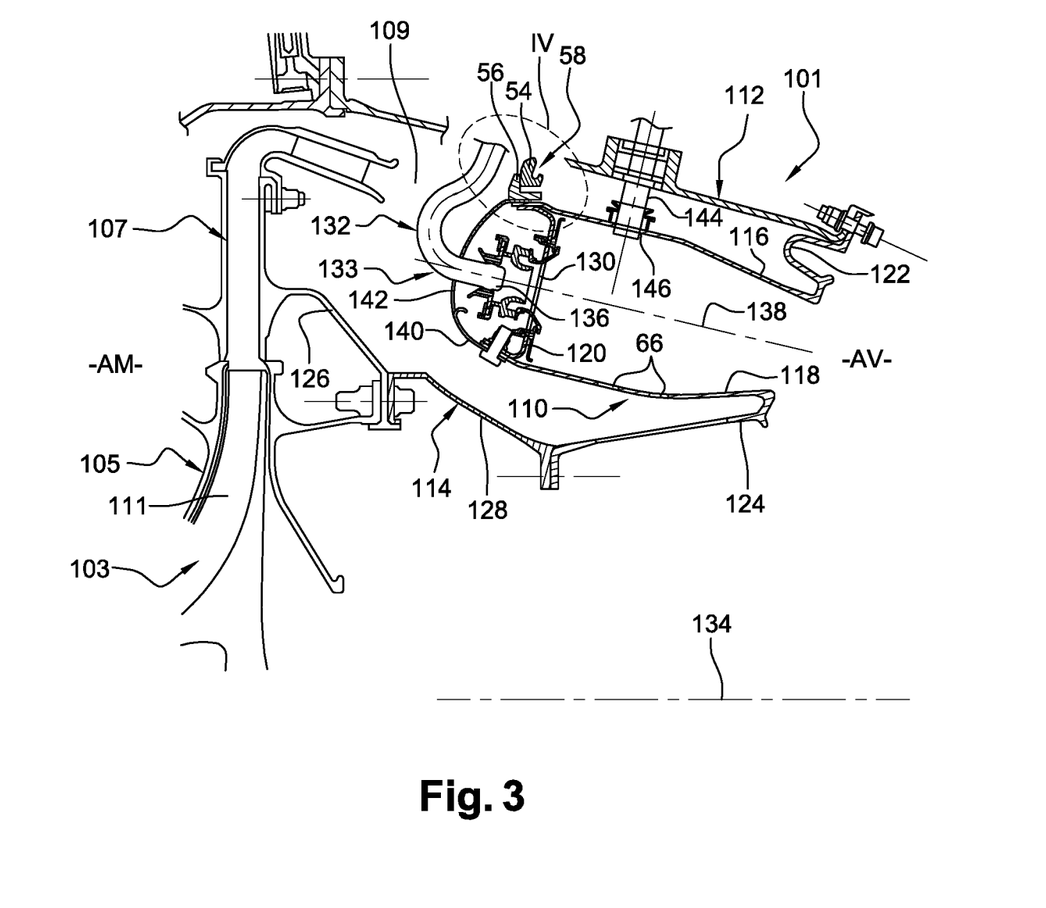
FIG. 3 is also the same schematic view as FIG. 1, but in an "advanced" version consistent with a solution according to this invention.

Referring to FIG. 3 and the subsequent Figures, different details of an example of an embodiment consistent with a solution according to the invention.

In this solution, elements that may be structurally and/or functionally identical to those already presented in connection with the solution of the prior art illustrated in FIGS. 1-2 are not described again below; their reference is just increased by 100 and they are thus identified on all or part of FIGS. 3-7.

Thus, the combustion module has become 101 and the combustion chamber, which has become 110, is still contained in module 101, with the external 112 and internal 114 housings. Module 101 is still installed downstream of at least one compressor 103 and, as in the exemplified version, at the outlet of the annular diffuser 107.

Figure 4:
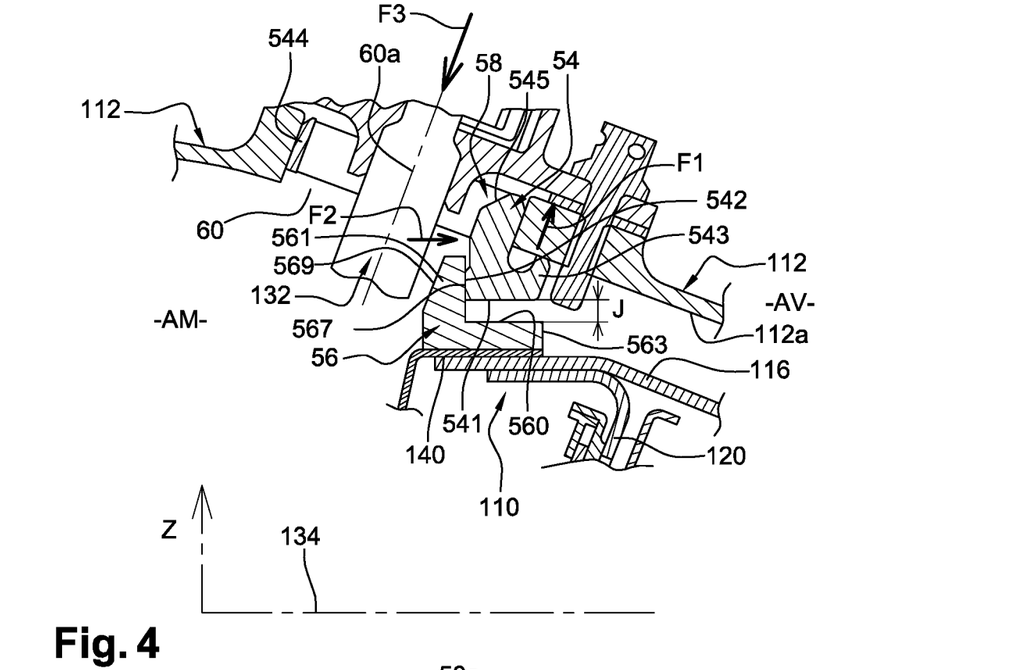
FIG. 4 is the detail IV of FIG. 3 and corresponds to section IV-IV of FIG. 6.

In this solution, it will be possible to limit/avoid substantial axial deformations at the chamber bottom wall 120 by providing, as shown in particular in FIG. 4, first stop parts 54 and second stop parts 56 fixed respectively to the outer housing 112 and to the annular combustion chamber 110.

These first and second stop parts 54, 56 are adapted to come to a substantially axial stop (i.e. substantially along axis 134), two by two, forming pairs of stops 58.

FIG. 4 shows two such parts 54, 56 in axial abutment one against the other, here at 12 hours.

Figure 5:
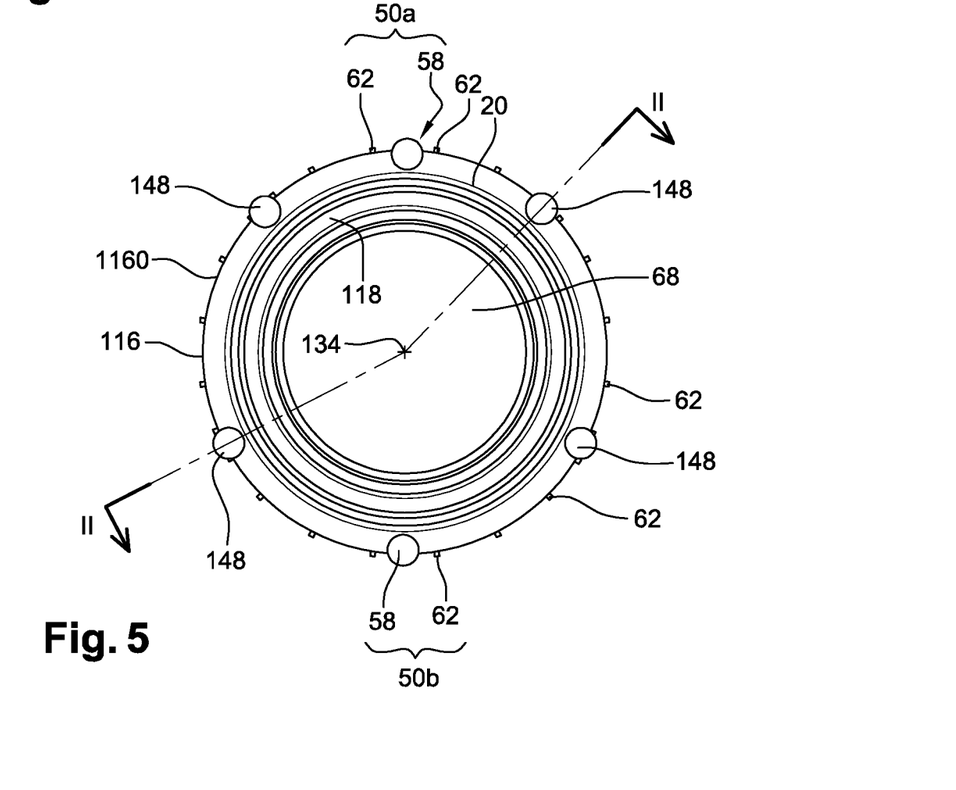
FIG. 5 is a schematic view from downstream (DS) of the inside of the combustion chamber, in its part surrounded by the outer wall (axis 116 below) of the chamber; the following elements 58,148 are materialized by circles at locations that could be theirs, angularly.

It may be preferable that the stop pairs 58 do not replace the above-mentioned upstream fixing pins, but complement them, identified as 148 in FIG. 5, to continue to take advantage of their stabilising effect. It will be understood that these fixing means upstream of chamber 110 can correspond to pins 48/148, with a mounting such as that of FIGS. 2 and 5. Pins 48 and 148 can thus be identical.

A (substantially) axial stop of the parts 54, 56, or even a (substantially) axial pre stress between them, can also be provided as soon as the temperature has returned to ambient (20° C.) and the turbo engine is idle, in order to anticipate the possibility of substantially axial forces and relative displacements, which may rapidly become very high as soon as the turbo engine is put into operation.

Thus, it is anticipated that at room temperature and with the turbo engine idle, in at least some of the stop pairs 58, the second stop part 56 may be axially in abutment against the first stop part 54.

In view of the partly anticipated constraints, it was also chosen that the second stop parts 56 fixed to the combustion chamber come to a abut, from upstream (US) to downstream (DS), against the first stop parts 54.

This will limit/avoid that above a certain threshold (e.g. 500-700° C. and 25-35×10$^5$ Pa), at least part of the bottom wall of chamber 120 moves excessively downstream.

In order to take up only the axial displacements, while absorbing, while the turbo engine is running, a clearance resulting from the difference in expansion between the outer housing 112 and the combustion chamber 110 as well as from the manufacturing tolerance of each part, it may be advantageous to provide that at least one substantially radial clearance J (axis Z, FIG. 4) is established between the first and second stop parts 54, 56 of each stop pair.

The clearance J is supposed never to be consumed, so the surfaces 541/560 below are supposed to be without contact with one another.

Concerning these stop pairs 58, they will be placed in all areas around the circumference of the combustion chamber 110 in order to take up the observed displacements. It may be preferred to do so at least in azimuth at 12 hours (upper vertical area) and 6 hours (lower vertical area); areas 50$a$ and 50$b$ respectively on FIG. 5. Thus, the combustion chamber 110 can be retained between the four fixing pins 148, which are distributed evenly around axis 34 (possible retentions, in particular between pins 148 at 135° and 225°, on the one hand, and at 315° and 45° on the other hand).

Figure 6:
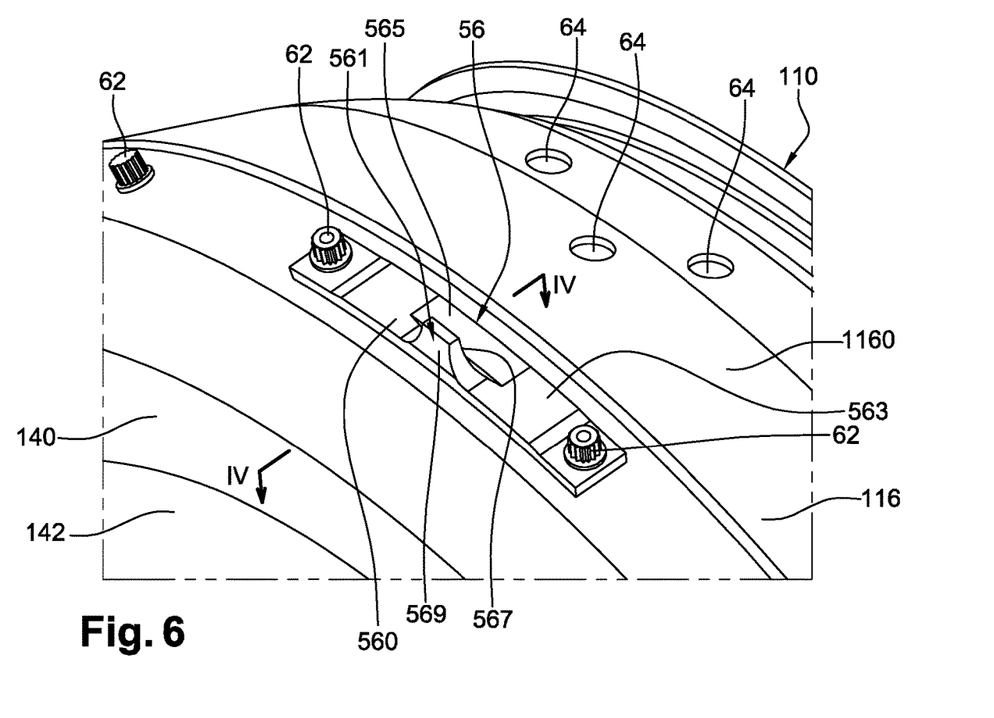
FIGS. 6, 7 are two local views in perspective of said second and first stop parts (56, 54 below) respectively, in their structural environment.
Figure 7:
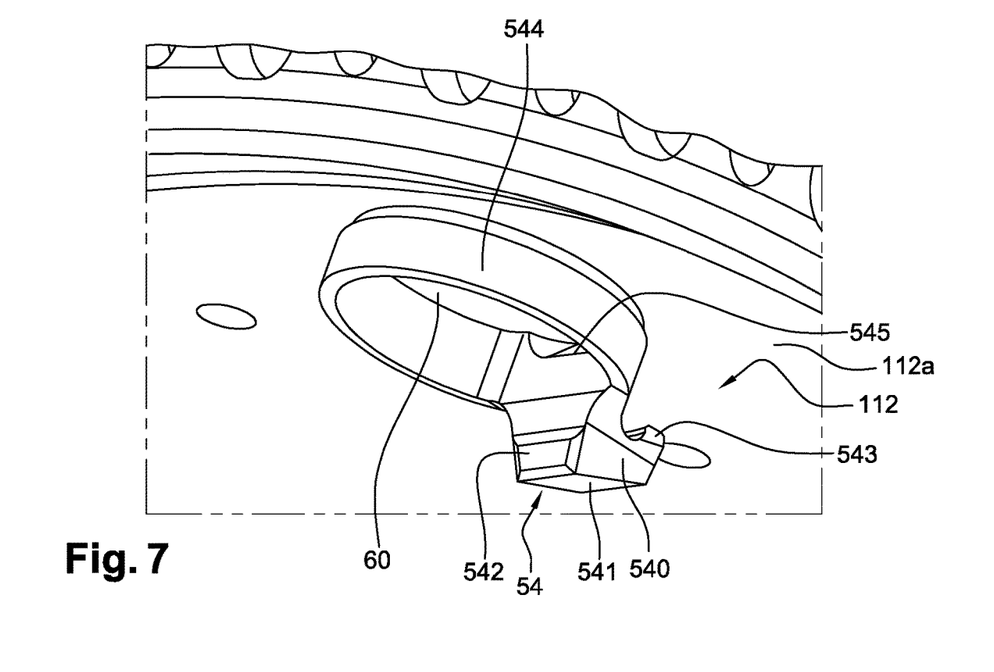

To avoid hyper-statism, it is also proposed in the selected preferred example:

that, as shown in FIG. 7, the first stop part 54 constitutes an inner protrusion 540 with respectively substantially axial 541 and substantially radial 542 surfaces, and that, as shown in FIG. 6, the second stop part 56 has a circumferential outer surface 560 with an axial component from which a substantially radial outer protrusion 561 projects locally, opposite the first stop part 54, against which the substantially radial surface 542 of the first stop part 54 can come into contact.

The inner protrusion 540 extends radially inwardly part 544 forming a ring of the first stop part 54.

In the solution of FIGS. 4 to 7, the axial stop is between the radial surface 542 of the inner protrusion 540 facing upstream and the radial surface 567 of the protrusion 561 facing downstream.

As for the radial stops, they can operate between surfaces 541 and 560, where clearance J can be provided permanently, so a priori exist at room temperature and with turbo engine idle.

The radial surfaces 542 and 567 should preferably each be flat in order to then ensure a plane-to-plane contact.

To bring the fuel inside the combustion chamber 110, FIGS. 3 & 4 show the presence of at least one fuel injector 132 passing through at least one orifice 60 of the outer housing 112, this injector then opening, by its head 136, towards the bottom (therefore upstream area) of the chamber 110, this along substantially the axis 138, here through the orifice 142 of the cover 140 and that, coaxial, 130 of the chamber bottom wall 120.

To combine a secure holding of the stop parts 54, 56, and both a practical installation and replacement, in a confined environment, the solution presented proposes, on each stop pair 58:

that, through said part 544 forming a ring, the first stop part 54 is mounted tightly, radially inwardly, locally in the relevant orifice 60 of the outer housing 112 (see FIG. 7), and that the second stop part 56 belongs to a locally shouldered plate 563 (in the example, presence of the substantially radial outer protrusion 561) fixed on an outer periphery 1160 of the combustion chamber (see FIG. 6).

In this case, the outer periphery 1160 of chamber 110 is formed by the outer periphery of the outer wall 116 of chamber 110.

For the same reasons, the solution presented even provides:

that the outer wall 116 be connected, at the bottom of the chamber, to the cover or fairing 140, by screws 62 circumferentially distributed around axis 138, and that the second stop parts 56 are fixed radially externally to the combustion chamber 110 by some of these screws 62.

Screws 62 are radial. They pass through an axial flange of the cover 140, an upstream end of the outer wall 116 and an axial flange facing upstream of the bottom wall 120 of chamber 110. Their heads protrude into the space between the outer wall 116 and the outer housing 112.

The plate 563 of the second stop part 56 will then be bent and will extend circumferentially well beyond the protrusion 561, as in the example in FIG. 6. Downstream, axially opposite the protrusion 561, the circumferential outer surface 560 of this stop part 56 may appear as locally flat (area 565 in FIG. 6), as may the opposite surface 541.

FIGS. 3 and 6 show the presence of holes 64, 66 (also called primary holes and dilution holes) through the outer and inner walls 116 and 118, respectively. Thus, the inner annular volume 68 of chamber 110, where the injectors 132 open and which extends axially between the outer and inner walls 116 and 118 can be supplied with dilution air from the compressor 103, via the annular diffuser 107, for example.

FIG. 3 shows the presence of downstream fasteners 122, 124, or flanges, between the outer revolution wall 116 and the outer housing 112, respectively, and between the inner revolution wall 118 and the inner housing 114, these connections/fasteners being either direct or indirect.

In the version shown in FIG. 7, the inner protrusion 540 of the first stop part 54 has a finger 543 that rests against the inner surface 112a of the outer housing 112. Thus, finger 543 is curved radially outwards. It blocks the first stop part 54 and distributes/takes up the radial forces exerted radially outwards by the second stop part 56 facing it (surface 560; force F1, FIG. 4). Angularly, around orifice 60, finger 543 should preferably also be oriented in the direction of the main axial force to be exerted on this first stop part 54 (force F2, FIG. 4). Finger 543 is thus, in the solution presented, positioned downstream of surface 542.

Finger 543 also facilitates the positioning of this set of stops, which therefore forms a housing stop.

To facilitate the positioning of injector 132 through port 60, the first stop part 54 has a chamfer 545. Positioned on the ring 544, on its internal diameter, as shown in FIGS. 4, 7, the chamfer 545 guides the injector 132 towards the axis of the orifice 60. The chamfer 545 can be advantageously followed, substantially in the continuity of its slope, by a second chamfer 569 which will then have, on the upstream side, the second stop part 56 which is associated with this first stop part 54. In fact, since the engagement of injector 132 through orifice 60 operates radially from the outside inwards (arrow F3, FIG. 4), the second chamfer 569 will preferably be closer to axis 60a of orifice 60 than the first chamfer 545, and less inclined than it is with respect to this axis.

In the solution just presented, the first stop part 54 is therefore engaged tightly, from the inside, in orifice 60, until the free end of finger 543 stops against the inner surface 112a of the outer housing 112.

Figure 8:
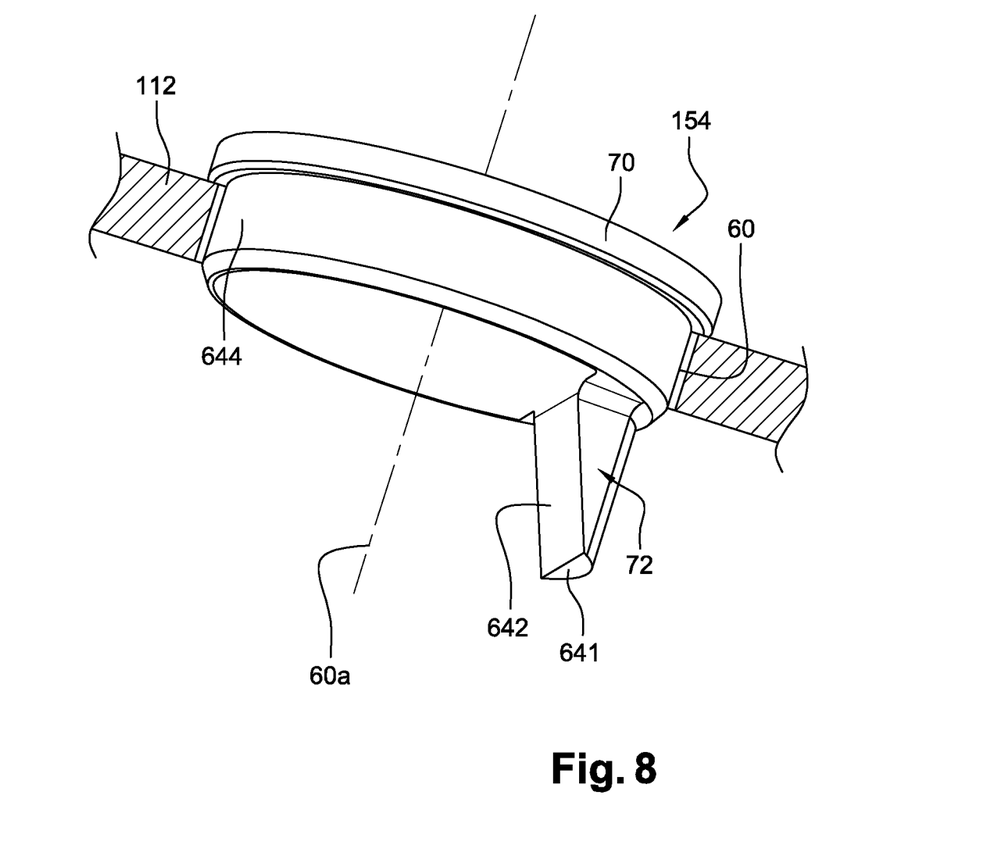
FIG. 8 illustrates an alternative to the solution in FIG. 7, in position against the outer housing.

A second solution is presented in conjunction with FIG. 8.

In this case, the second stop part 56 is unchanged, but the first stop part 54 is modified. In this solution, elements that may be structurally and/or functionally identical to those already presented in connection with the solution in FIGS. 3 to 7 are not described again below; their reference is just increased by 100 and they are thus identified in FIG. 8.

Thus, the first stop part is referenced 154. It includes, on its ring 644, a flange 70, at the point of its radially outer diameter. This limits the risk of shrink-fitting loss during operation.

In addition, the flange can be used to dispense with the need for a support finger (543 above). Indeed, such a support finger against the housing 112 may require two machining operations (turning+milling). Without this support finger, the manufacture of the first stop part 154 can be easier and cheaper.

In this second solution, the radial stops will be between axial surfaces 641 and 560, where clearance J can still be provided permanently. The axial stop will be between the radial surface 642 facing upstream and the radial surface 567 facing downstream of the first stop part 54. The surfaces 641 and 642 of the second stop part 156 are present on a radially inner protrusion 72 of this stop part which extends the ring 644. Angularly, around the axis of the ring 644, the protrusion 72 will be placed as it would have been chosen for finger 543, and facing the above-mentioned surfaces of the first stop part 54.

This method of construction allows radial positioning from the outside, which is easier for the assembler: the protrusion 72 is engaged beyond orifice 60, with the ring 644 in the orifice and the flange 70 radially on the outside.

The invention claimed is:

1. A combustion module for an aeronautical gas turbine engine, the combustion module having a longitudinal axis and comprising:

an inner housing extending around the longitudinal axis, an outer housing extending around the longitudinal axis and arranged, radially to the longitudinal axis, outside the inner housing, an annular combustion chamber:

extending around the longitudinal axis, coaxial with said longitudinal axis, in which a mixture of air and fuel can flow from upstream to downstream, and disposed between the inner housing and the outer housing, the combustion chamber comprising an inner revolution wall and an outer revolution wall both extending annularly around the longitudinal axis, both arranged, radially to the longitudinal axis, between the inner housing and the outer housing and both connected upstream to a chamber bottom wall, and a series of stop pairs disposed annularly around the combustion chamber, each stop pair of the series of stop pairs comprising a first stop part and a second stop part fixed respectively to the outer housing and to the combustion chamber, the first stop part and the second stop part being adapted to come to a substantially axial, in at least some of said stop pairs of the series of stop pairs:

the first stop part being an internal protrusion present on the outer housing, having an axial surface and a radial surface with respect to the longitudinal axis, and the second stop part having a circumferential outer surface with an axial component parallel to the longitudinal axis, characterized in that an outer protrusion radial to the longitudinal axis, against which the radial surface of the first stop part comes into contact, projects locally, opposite the first stop part, from said circumferential outer surface with said axial component, the combustion module further comprising at least one fuel injector passing through at least one orifice of the outer housing to bring fuel into the combustion chamber, and in which, on at least one of said stop pairs:

the first stop part defines a portion of a ring mounted in the at least one orifice of the outer housing, at a location of a portion of the outer housing which is inclined at an angle with respect to the longitudinal axis, and the second stop part belongs to a locally shouldered plate, fixed on an outer periphery of the combustion chamber.

2. The combustion module according to claim 1, in which, on one of said stop pairs, the second stop part fixed to the combustion chamber come into contact from upstream to downstream with the first stop part.

3. The combustion module according to claim 1, wherein at least one substantially radial clearance is established between the first stop part and the second stop part of the each stop pair.

4. The combustion module according to claim 1 in which a stop between said outer protrusion of the second stop part and the radial surface of the first stop part occurs between two plane surfaces in order to ensure a plane-to-plane contact.

5. The combustion module according to claim 1 in which, at room temperature and with the gas turbine engine idle, in at least some of the stop pairs, the second stop part is axially abutting against the first stop part.

6. The combustion module according to claim 1, in which, on the first stop part, the internal protrusion has a finger which rests against an inner surface of the outer housing, the inner surface being inclined at an angle with respect to the longitudinal axis.

7. The combustion module according to claim 1 wherein the portion of the ring has a flange at a location of a radially outer diameter, the protrusion being free of support against the outer housing.

8. The combustion module according to claim 1, wherein:
the outer revolution wall is connected to the chamber bottom wall by screws,
and the second stop parts are fixed radially outwardly to the combustion chamber by some of said screws.

9. The combustion module according to claim 1, which further comprises upstream fixing means on the combustion chamber, for fixing said combustion chamber to the outer housing.

10. A part of an aeronautical turbo engine comprising:
at least one compressor and an air diffuser located at an outlet of said at least one compressor,
the combustion module according to claim 1 and wherein the inner housing comprises an intermediate wall fixed with a ferrule of the air diffuser.

11. The combustion module according to claim 10, in which, on one of said stop pairs, the second stop part fixed to the combustion chamber come into contact from upstream to downstream with the first stop part.

12. The combustion module according to claim 10, wherein at least one substantially radial clearance is established between the first stop part and the second stop part of the each stop pair.

13. The combustion module according to claim 10 in which a stop between said outer protrusion of the second stop part and the radial surface of the first stop part occurs between two plane surfaces in order to ensure a plane-to-plane contact.

14. The combustion module according to claim 10 in which, at room temperature and with the aeronautical turbo engine idle, in at least some of the stop pairs, the second stop part is axially abutting against the first stop part.

15. The combustion module according to claim 10, in which, on the first stop part, the internal protrusion has a finger which rests against an inner surface of the outer housing, the inner surface being inclined at an angle with respect to the longitudinal axis.

16. The combustion module according to claim 10, wherein:
the outer revolution wall is connected to the chamber bottom wall by screws,
and the second stop parts are fixed radially outwardly to the combustion chamber by some of said screws.

17. An aeronautical gas turbine engine comprising the combustion module according to claim 1, the longitudinal axis of the combustion module being coaxial with a longitudinal axis of the aeronautical gas turbine engine.

* * * * *